United States Patent Office 3,418,128

Patented Dec. 24, 1968

3,418,128

PHOTOSENSITIVE COMPOSITIONS COMPRISING ACID ADDITION SALTS OF SUBSTITUTED LEUCOCYANIDE TRIPHENYLMETHANE DYES AND METAL PERCHLORATES

Georg C. Huett, Philadelphia, Pa., assignor, by mesne assignments, to Eugene Dietzgen Co., Chicago, Ill., a corporation of Delaware No Drawing. Filed Jan. 4, 1965, Ser. No. 423,290

4 Claims. (Cl. 96—90)

ABSTRACT OF THE DISCLOSURE

This invention relates to light sensitive dyes for use in direct print-out photosensitive copy systems and particularly, with preparation of new photosensitive derivatives of triarylmethane dyes, comprising acid addition salts of substituted leucocyanide triphenylmethanes and metal perchlorates, for use in such systems.

Aminotriarylacetonitriles or leucocyanides of triphenylmethane in solution with so-called "activators" have been known to be photosensitive when exposed to short wave length radiation such as ultraviolet light or other actinic light, preferably between 2000 and 3600 angstrom units. Upon such exposure, through a transparency, said otherwise colorless dyes are dissociated or converted to colored dyes in a reaction which has been variously explained by patentees such as Lyman Chalkley, Meyer S. Agruss and perhaps others in this field. Principally, it has been believed that the reaction involved can be characterized as being of a free radical mechanism which results in separation or fragmentizing of the leuco base of triphenylmethane dye molecule employed into a free radical which is in a highly excited relatively unstable state, i.e., its colored state. Because of its relative instability in the colored state, some means had to be provided to prevent conversion to the colorless state or reaction with other free radical bonding means. Prior art compositions have not achieved commercial acceptance which can be attributed to the previously unsuccessful attempts to prevent fade out of the colored dye images within relatively short periods of time under both ambient light conditions and even storage in the dark, the long exposure time required to realize the colored form of the dye, and various other reasons of which the skilled artisans are knowledgeable. To my knowledge there has not been any material and/or significant commercial exploitation of such prior photosensitive compositions notwithstanding the recognized advantages of a direct print-out photosystem.

According to my invention, I provide a new leuco type, triarylmethane dye intermediate photosensitive to certain wave length radiation for direct print-out systems which does not require admixture of an "activator" with the triphenylmethane leucocyanide dye. Further, I provide a novel leuco dye intermediate which can be coated on a suitable paper or substrate for conversion to a stable colored form of the dye upon exposure to suitable actinic light so as to be substantially more resistant to fade out from ambient light or other sources of adverse affects to the product.

Further according to my invention, I provide for preparation of a new class of leuco type, triarylmethane dye intermediate compositions suitable for coating on a substrate which for purposes of activation by exposure to a suitable carrier or substrate, exposure of the composition pound mixed therewith.

The intermediate dye product embodying the invention is suitable for use in direct print-out systems using well known techniques. For this reason it is believed best to appreciate that one of the advantages attributable to my invention is that such well known techniques as coating a suitable carrier or substate, exposure of the composition embodying the invention to actinic light passing through a transparency, etc. may still be employed with my invention to full advantage.

As a practical matter, many of the leucocyanide dyes capable of being converted to their colored form by exposure to short wave length radiation can be used. These are generally of the class known in the art as the leucocyanides of triarylmethane dyes. Suitable triphenylmethyl leucocyanide compounds for the general chemical synthesis reactions involved in my invention have the general structural formula

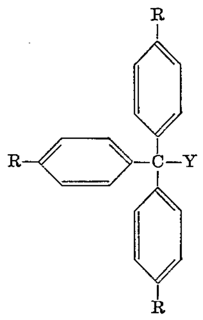

wherein one or more of the R groups can be H, $NH_2$, OH, or NXH or $NX_2$ where X is an aliphatic and/or aromatic radical, and others and Y is a negative radical group such as CH, a halogen, CN, OH, etc.

I have been especially successful with the leucocyanide of triphenylmethane but recognize that leucocyanide derivatives of pararosaniline, malachite, green, crystal violet, rosaniline, magenta, the fuchsine series and the like are suitable.

The synthesis of my intermediate dye product is initiated with preparation of a solution of the leucocyanide dye in which the leuco cyanide dye is prepared in a solvent medium such as methyl Cellosolve. To this solution is added under gradual stirring an equal molar amount of a concentrated acid such as hydrochloric, sulfuric or the like strong acid. A protonated form of the leuco cyanide dye is obtained which is of a homogeneous color corresponding to the respective color of the leucocyanide dye used, such as, for instance, blue where copy violet was dissolved in the methyl Cellosolve. In a separate vessel, a solution of magnesium perchlorate and methyl Cellosolve was prepared which was then admixed with the protonated form of the dye with continuous stirring. A homogeneous color solution resulted to which I added water to obtain a fine flocculant precipitate. Filtering off, washing and drying of the precipitate yielded a fine pale violet-blue powder in the case of crystal violet which is highly sensitive to light.

This intermediate dye product can be coated on a suitable paper or other substrate without using any of the known or other activator compounds. Coating techniques well known in the art can be used. Synthetic resins capable of forming coating films would be suitable methacrylates, polyvinyl and cellulose acetates, polyethylene-butadiene-styrene copolymers, butadiene acrylonitrile copolymers, acrylic and methacrylic ester polymers and copolymers among other resin film formers can be used.

Departures from the specific ingredients named above are feasible. For instance, silver perchlorate, aluminum perchlorate, zinc perchlorate, the alkaline earth metal perchlorates can be substituted for the magnesium perchlorate. Also, basic Lewis acids may be used, such as of stannic chloride or fluoride, zinc chloride or fluoride and others well known. These ingredients appear to be high polarity and high energy absorption and transfer agents. Other solvent mediums for the leuco cyanide dye are known aliphatic and aromatic solvents, such as, low molecular weight alcohols, hydrocarbons, esters, etc. just to name a few.

While the absolute chemical reaction mechanisms involved in my invention are not absolutely known to me, I believe that I have basis for theorizing with respect thereto as follows:

In the first mentioned reaction where the leuco cyanide dye dissolved in methyl Cellosolve is mixed with the strong acid, such as hydrochloric, in equal molar amount to the amount of leucocyanide dye, a highly colored solution of protonated leuco cyanide dye is derived pursuant to the following formulation:

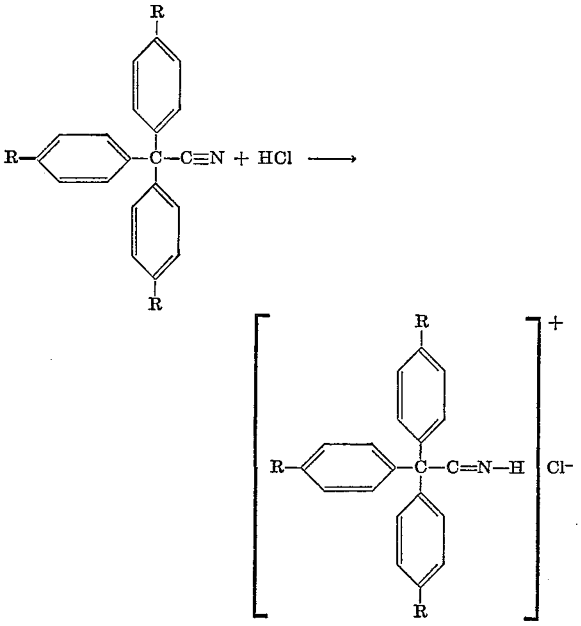

(1)

Then, when the protonated form of the leucocyanide dye is mixed with the metal perchlorate, such as magnesium perchlorate, a complex may be formed as follows:

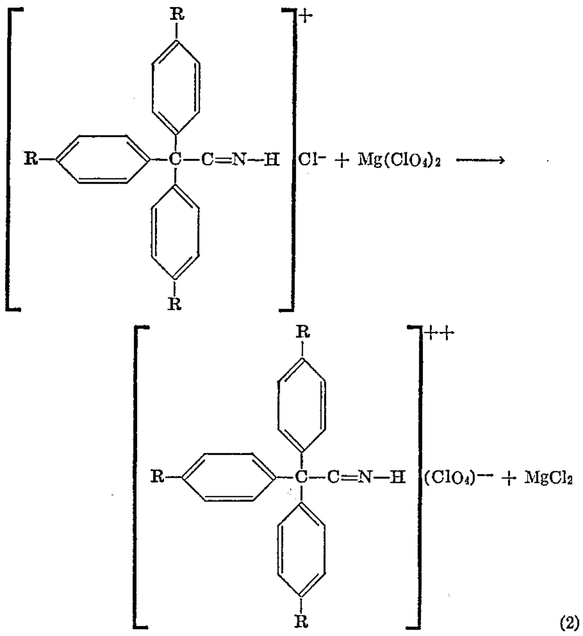

(2)

Upon adding water, the salt form is precipitated. It is contemplated that other coordinative complex formations can exist within such a complicated chemical environment.

When actinic light impinges upon the salt complex of Equation 2, a triphenylmethane ion form is realized which is incapable of converting again completely to the colorless form.

Successful testing of the new dye intermediate described herein has taken place with the following indicated results:

(1) Depending upon the type of master material and the intensity of the light source, printing speed achieved was from 0 to 60 feet per minute.

(2) Stability of the printed material depended upon the nature of the light source, i.e., fluorescent or incandescent or natural light and the distance between the light source and coated substrate was from two to four months.

(3) Stability in a darkened environment, such as, a closed envelope, was more than one year and gave indications of approaching toward being substantially permanent.

My intermediate dye product can be coated on plastic films such as Mylar, acetates, etc., photographic base paper, diazo base paper and paper stock, either with or without rag content. This product was sensitive to ultraviolet light and other actinic light such as well known in this art.

The following examples illustrate a preferred embodiment of the invention and are not intended to be construed as limitative thereof.

Example 1

A coating mixture was prepared in which solution 1 was prepared with 4.0 grams of methyl Cellosolve, 0.39 gram leucocyanide of triphenylmethane such as crystal violet and 0.10 gram of HCl (32%).

Solution 2 was prepared with 3.00 grams of methyl Cellosolve and 0.30 gram of magnesium perchlorate.

After solutions 1 and 2 were mixed, 3.5 grams of water was added to precipitate the intermediate dye product of the invention.

This example employs approximately equal molar quantities of leucocyanide dye, acid and perchlorate.

Example II

A coating mixture was prepared according to the directions of Example I with the exception that the amount of magnesium perchlorate used was reduced to 0.1 gram.

Example III

A coating mixture was prepared according to the directions of Example I with the exception that the amount of the perchlorate was increased to 0.6 gram.

I believe that the amount of perchlorate may vary from that used in Example I within a range of ⅓ to 2 times the amount stated without altering the stated amount of dye and/or acid used. Likewise, I believe that the amount of acid may be varied within a range of ½ to 2 times from that of Example I without altering the stated amount of dye and/or perchlorate.

It is believed that the invention has been described in sufficient detail to enable the skilled artisan to practice the same. It is not intended that the invention be limited by the foregoing except as may be required by the appended claims.

I claim:

1. A photosensitive dye intermediate composition comprising an organic solvent solution of the acid addition salt of a substituted leucocyanide triphenylmethane and a metal perchlorate, said metal being selected from the group consisting of an alkaline earth metal, silver, aluminum and zinc.

2. A photosensitive dye intermediate composition as in claim 1 wherein said metal perchlorate is magnesium perchlorate.

3. The method of rendering a leucocyanide of a triphenylmethane photosensitive comprising, mixing an organic solvent solution of a leucocyanide triphenylmethane with a strong mineral acid to produce the acid addition salt thereof, adding thereto an organic solvent solution of a metal perchlorate selected from the group consisting of alkaline earth metal perchlorate, silver perchlorate, aluminum perchlorate, and zinc perchlorate, and thereafter, precipitating a triphenylmethane leucocyanide complex intermediate which is sensitive to light radiation of a conventional wave length.

4. A method as in claim 3 wherein said metal perchlorate is magnesium perchlorate.

References Cited

UNITED STATES PATENTS 2,324,060 7/1943 Boughton ------------ 96—90

FOREIGN PATENTS 649,723 10/1964 Belgium.
1,047,796 11/1966 Great Britain.

OTHER REFERENCES

Chemical Abstract of Golosnitskaya, V.A., et al. "Reactions of Perchlorates with Certain Triphenylmethane Dyes" (1964).

Germann, et al. "Studies on the Reactions of the Leucocyanides of the Triphenylmethane Dyes." J. Am. Chem. Soc., vol. 62, January 1940, pp. 110–112.

Venkataraman, K. The Chemistry of Synthetic Dyes, vol. 2, 1952, pp. 707–709.

NORMAN G. TORCHIN, *Primary Examiner.*

C. E. DAVIS, *Assistant Examiner.*

U.S. Cl. X.R.

260—390, 391, 393